(12) United States Patent  (10) Patent No.: US 8,818,975 B2
Aigner et al.  (45) Date of Patent: Aug. 26, 2014

(54) DATA MODEL ACCESS CONFIGURATION AND CUSTOMIZATION

(75) Inventors: Werner Aigner, Willmering (DE); Ralf Ehret, Walldorf (DE); Roman Moehl, Zwingenberg (DE)

(73) Assignee: SAP AG, Walldorf (DE)

( * ) Notice: Subject to any disclaimer, the term of this patent is extended or adjusted under 35 U.S.C. 154(b) by 246 days.

(21) Appl. No.: 12/642,286

(22) Filed: Dec. 18, 2009

(65) Prior Publication Data

US 2011/0153624 A1  Jun. 23, 2011

(51) Int. Cl.
*G06F 17/30* (2006.01)
(52) U.S. Cl.
USPC .......................................... 707/705; 707/754
(58) Field of Classification Search
USPC ................................... 707/705, 754
See application file for complete search history.

(56) References Cited

U.S. PATENT DOCUMENTS

| | | | |
|---|---|---|---|
| 5,813,009 A * | 9/1998 | Johnson et al. | 707/695 |
| 7,337,132 B2 * | 2/2008 | Viswanath et al. | 705/26.81 |
| 7,657,557 B2 * | 2/2010 | Super et al. | 717/109 |
| 8,121,860 B2 * | 2/2012 | Haskell et al. | 705/2 |
| 8,126,692 B2 * | 2/2012 | Arnold et al. | 703/13 |
| 8,126,693 B2 * | 2/2012 | Arnold et al. | 703/13 |
| 8,131,577 B2 * | 3/2012 | Lessing et al. | 705/7.11 |
| 8,145,506 B2 * | 3/2012 | Haskell et al. | 705/3 |
| 2010/0153432 A1 * | 6/2010 | Pfeifer et al. | 707/769 |

* cited by examiner

*Primary Examiner* — Kim Nguyen
(74) *Attorney, Agent, or Firm* — Schwegman Lundberg & Woessner, P.A.

(57) ABSTRACT

Apparatus, systems, and methods may operate to publish one or more stored back end data models accessible to a user interface and a development environment; to receive a configuration context; to generate derived model attributes by filtering, according to the configuration context, back end data attributes associated with the stored back end data models; to derive a set of mapping rules based on the derived model attributes; and store the set of mapping rules to be used to direct run-time data model request transformation activity. Further activities may include receiving an end-user request from a displayed user interface, transforming the end-user request into a transformed request according to the stored set of mapping rules, and transmitting the transformed request to one of the stored back end data models. Additional apparatus, systems, and methods are disclosed.

21 Claims, 10 Drawing Sheets

Display View "Maintain Sales Order Types": Overview

| SaTy | Description | Block |
|---|---|---|
| ZSAL | Sales Process CRM | |
| ZSB | Third Party w/o SN | |
| ZSBC | Standard Order | |
| ZSC7 | SP: PS-Contract | |
| ZSD1 | Packaged Svcs Order | |
| ZSDQ | Packaged Svcs Quote | |
| ZSE | Third Party with SN | |
| ZSE1 | Service Process CRM | |
| ZSEA | SP inbound order | |
| ZSJ1 | Inquiry(ZSPI) | |
| ZSJ2 | Project QuotationSPJ | |
| ZSMO | SM Standard Order | |
| ZSOS | SP: SD/PS Order | |
| ZSP | LSP Booking | |
| ZSP0 | SP: Govt Contract | |
| ZSP1 | SP: Service order | |
| ZSP2 | SP: Cost Plus FF | |
| ZSP3 | SP: Cost Plus DMR | |
| ZSP4 | SP: Time & Matl | |
| ZSP5 | SP: T&M DMR (OverlL) | |
| ZSP6 | SP: T&M (D) | |
| ZSP7 | SP: T&M DMR (RoleL) | |
| ZSQ5 | SP: PS-Quotation | |
| ZTA | TA Standard Order | | ← 410
| ZTN | Standard Order | |
| ZTSC | Sales/Complaint | |
| ZTTA | Territory TA (CRM) | |
| ZUII | UII Sales Order | |
| SC0 | Stand Unit Costing | |
| ZUSS | US Sales Order | |
| ZWK1 | Value contract IDES | |
| ZXI | XI Sales Order | |
| ZZOR | SL OC Booking | |
| ZZOT | SL OC Quotation | |
| ZZSC | SL Service Contract | |
| ZZZ | Test STO | |

Position    Entry 265 of 300

*FIG. 4*

DATA MODEL ACCESS CONFIGURATION AND CUSTOMIZATION

LIMITED COPYRIGHT WAIVER

A portion of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data described below and in the drawings and appendices that form a part of this document: Copyright 2009 SAP AG, All Rights Reserved.

BACKGROUND

When an end-user interacts with an enterprise-wide business application, multiple computers, databases, networks, and/or devices are often involved. Thus, along the path of information consumption and processing, there are usually several different layers of software.

While enterprise applications are often structured to optimize data for consistency, integrity, compliance, and operations, end-users usually expect structures that are more closely related to the real world and the work environment they inhabit. The resulting gap between information consumers and information providers often leads to poor usability and expensive software application integration projects.

BRIEF DESCRIPTION OF THE DRAWINGS

Some embodiments are illustrated by way of example and not limitation in the figures of the accompanying drawings, in which:

FIG. 1 illustrates a portion of an ABAP Dictionary displayed as a table according to various embodiments of the invention;

FIG. 2 illustrates another portion of the ABAP Dictionary of FIG. 1, with APPEND structures listed, according to various embodiments of the invention;

FIG. 4 illustrates an example of the allowed Customer Name Space details for the Sales Document Type field taken from the table of FIG. 1, according to various embodiments of the invention;

DETAILED DESCRIPTION

Figure 3:
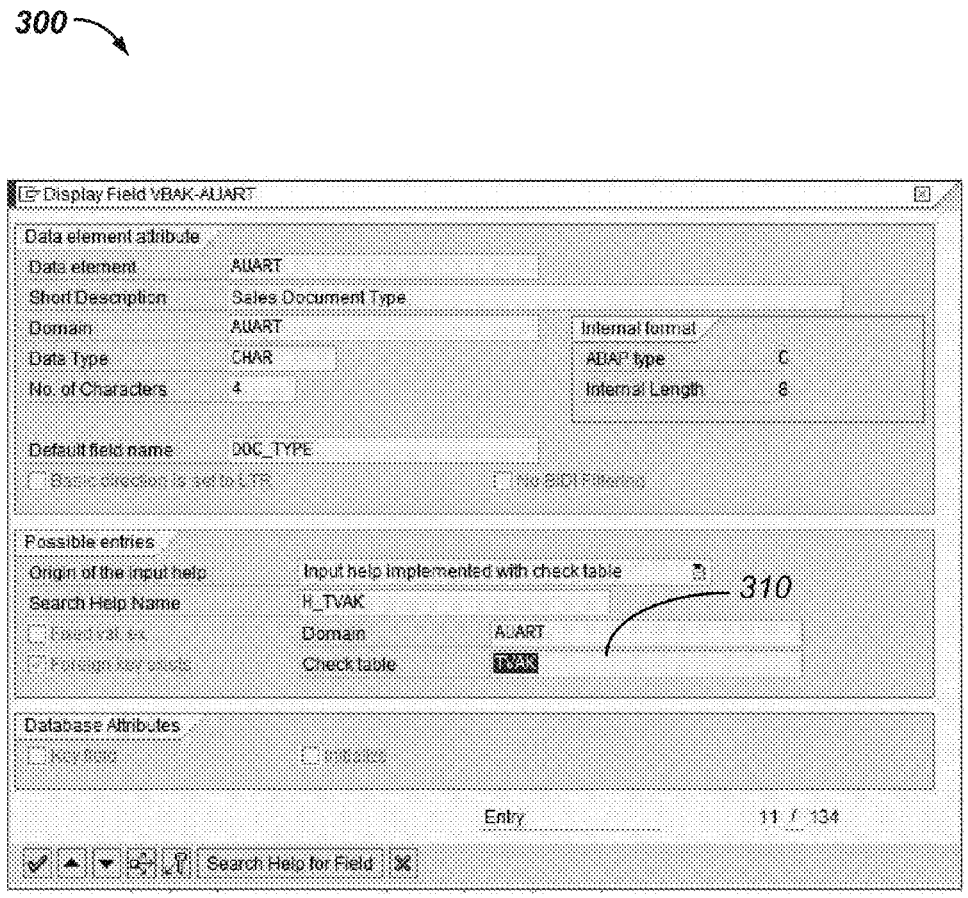
FIG. 3 illustrates details for the Sales Document Type field taken from the table of FIG. 1, according to various embodiments of the invention.

Enterprise-wide applications are widely used, and the associated data models are therefore consumed by a variety of applications. Some of these consuming applications are closer to the back end, and some, such as web stores, are closer to the front end. The location of the application in the chain of consumption thus influences the granularity of the model to be consumed. With enterprise-wide applications being used as a source of information and functionality in many new and different channels, it can often be useful to bridge the gap between the data models used for consumption, and those expected by end-users. For example, when a given data model is formatted in an application-agnostic manner, the difference between what is provided and what is expected can become even more complicated because business applications may be configured, customized and extended at the customer site to match a specific situation, such as the organizational setup, supported business processes, industry-specific or customer-specific enhancements, and legal requirements. These settings may dramatically change the behaviour of the overall system.

The complexity that can be added due to configuration, customizing, and extensibility leads to a variety of challenges, including:

How to expose all of the different customizing and extensibility choices in a structured manner that allows interpreting them using a single design tool?

How to provide access to all the available information externally (not just the pure application interfaces)?

What rules should be applied to reduce the available data to a manageable amount? That is, to adapt the exposed data models and interfaces to eliminate unnecessary overhead?

How to provide operational flexibility that operates during design-time and run-time?

How to handle changes to the original data model?

In many embodiments, several of these challenges are addressed by adapting an original data model to a specific configuration, with customized settings and extensibility handled in an automatic fashion to simplify and tailor information consumption to the specific customer situation. In this way, the designer can take an original data model and explore the related customizing settings and extensions via interfaces to the back end. In many cases, the operation during design-time can result in a proposal to, for example, set filter values and disable specific functionality not applicable to the situation at hand.

Thus, several embodiments provide configuration and extension information at design-time through dedicated interfaces. Rules are provided by an application which supports automated reaction to customized sections. The derived model can be configured according to the customer's settings. Changes to the back end configuration can be discovered via solicitation, or proactive notification. In some embodiments, manual actions and semi-automated activity are also permitted. Thus, many embodiments may be realized.

To better understand the process involved, one may consider an example business scenario, perhaps directed to sales order management. For example, an end-user might want to create an on-line store (e.g., web shop) for stationery, storing the incoming orders as part of the original (very large and application-agnostic) back end system.

The back end system includes one or more applications, databases, and at least one internal data model which is quite complex. For example, the data model can be used to support sales orders across many different industries, from stationary to jet airplanes. That is, the data model includes thousands of fields, having a deep structure with many nodes.

The web shop represents the front end where end-users can order stationery. For consumer acceptance of the web shop, it is useful to design operations in such a way that the end-user can easily browse the on-line catalog and order stationery in a simple manner without knowing anything about the back end processing. A sales order for the web shop should therefore have a very simple structure and only a subset of the possibilities presented by the actual back end sales order data fields.

The developer in this case might act to create the web shop and populate the more extensive back end interface with the appropriate set of data. To do this correctly, the developer should have a good understanding of the complex structure exposed by the general back end interface. This might happen by educating the developer as to the specifics of the back end system with respect to configuration, customization and extensions. The developer may even interact with back end experts to get a new type of order for stationery goods. Thus, even though only a small portion of the total back end interface is needed by the developer to produce the stationary order form, the developer will likely need to know about all of the available interface elements to properly execute his commission. This is because the back end interface is generic for all customers and does not take the specifics of any one customer into account.

To reduce the size of the problem somewhat, an adaptation layer can be built which simplifies consumption of the original data model via tailor-made services that are layered on top of generic ones. For example, the adaptation layer might exist in the form of a series of templates, or public solution models that are specific to various industries.

With the adaptation layer in place, the developer might use a tool, as described herein, to take the industry-specific template, and tailor the template (using the template itself as an original data model) to suit the needs of the stationery web shop. The tool, which in some embodiments incorporates an integrated development environment (IDE), can then be used to create appropriate services that are consumed directly by the web shop. The discrepancy between the data model provided by the template, and that used by the web shop, represents the "gap" between consumption and the end-user that has been mentioned previously.

Thus, various embodiments operate to bridge the gap in data models, whether it is between the original data model provided by the back end interface, or one that is presented by a reduced/extended version of the original, in the form of an industry-specific template, for example, and what is appropriate for the end-user application—in this case, a data model that is derived from the original to reflect what is appropriate for a stationary web shop.

In the case of applications (e.g., SAP business applications) which are configured at the customer side to the specific needs of the customer, an additional source of information to bridge the gap in the data model is customization and configuration data which is stored in these business applications. This information, together with rules governing its impact on the data models and the interfaces, can be made available to the developer in an adaptation tool. Such a tool can be configured to change the data model in an automated fashion, or a semi-automated fashion, perhaps by offering concrete proposals or options with respect to how the data model can be changed. In this way, tailored interfaces can be created which take the customization and configuration data directly into account.

To understand how this kind of bridging functionality can be achieved, it is useful to consider an example—perhaps one that involves an original data model represented (at least in part) by an ABAP Dictionary. ABAP (Advanced Business Application Programming) is a high level programming language created by SAP AG in Walldorf, Germany. ABAP is currently positioned, alongside the more recently introduced Java, as a language for programming SAP AG's Web Application Server, part of its NetWeaver® technology platform for building business applications.

Data definitions (metadata) can be created and managed in an ABAP Dictionary. The ABAP Dictionary can provide a central description of all the data used in the system without significant redundancies. New or modified information is automatically provided for all system components. This ensures data integrity, data consistency, and data security.

Corresponding objects (tables or views) can be created in the underlying relational database using these data definitions. The ABAP Dictionary therefore describes the logical structure of the objects used in application development and shows how they are mapped to the underlying relational database in tables or views. The ABAP Dictionary also provides standard functions for editing fields on the screen, for example for assigning a screen field an input help.

In many embodiments, an automated mechanism which inspects customizing information in customizing tables and available extension points (e.g., APPEND structures in the ABAP Dictionary and BADIs—Business Add Ins—which are just some of many potential extension points in ABAP products) and offers this information as a proposal for how to adapt the underlying model is described. This includes a standard way of expressing the settings to be consumed by the tool based on a domain-specific language and business rules.

The SAP® ERP application comprises integrated enterprise resource planning (ERP) software manufactured by SAP AG that targets business software requirements of mid-size and large organizations in all industries and sectors. It allows for open communication within and between company functions.

The ERP Central Component (ECC) provided by SAP AG permits building and developing an environment of other products that can function upon the foundation of the central component. SAP AG's ERP application solution includes several modules that support various functional areas within an organization, including SAP ERP Financials, SAP ERP Logistics, and SAP ERP Human Resource Management. The following example is a simplified one using application models that exist within the ECC Sales & Distribution (S&D) function.

Figure 1:
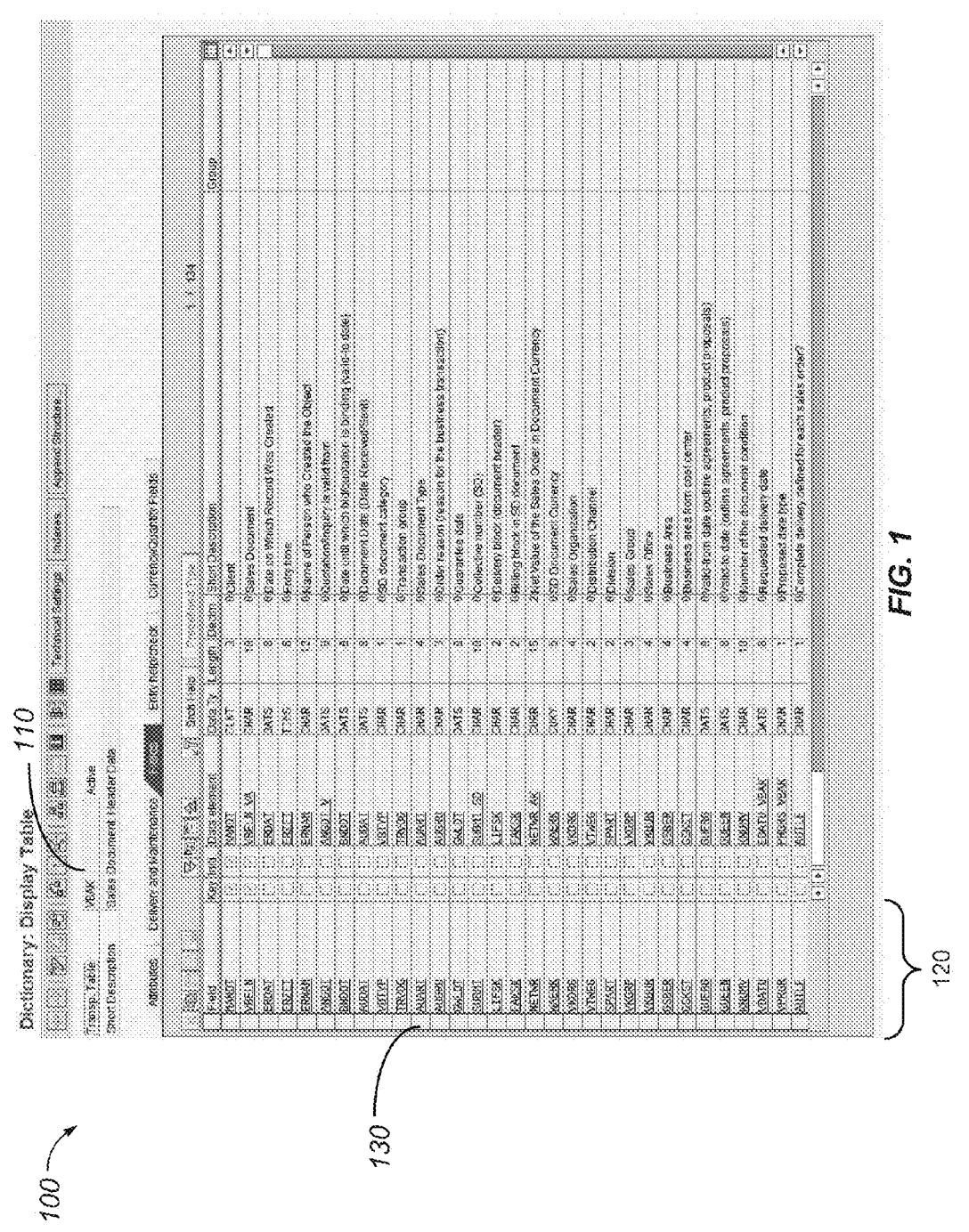

FIG. 1 illustrates a portion of an ABAP Dictionary 100 displayed as a table according to various embodiments of the invention. In the ECC S&D function, there are two main tables: the header (VBAK) table 110 and the item (VBAP) table which are used to describe a sales order. The header table 110 contains customer information, dates, and the shipping information. The item table contains products, quantities, and prices. As shown in FIG. 1, the header table 110 has more than one-hundred fields 120. One of the fields in the header table 110 is the AUART field 130, which contains data related to the Sales Document Type. Of course, many of these fields 120 would not be needed with respect to a stationary web shop sales order form (e.g., the ANGDT field, which gives a quotation/inquiry "valid from" date, and the AUGRU field, which describes the reason for entry of the business transaction).

Figure 2:
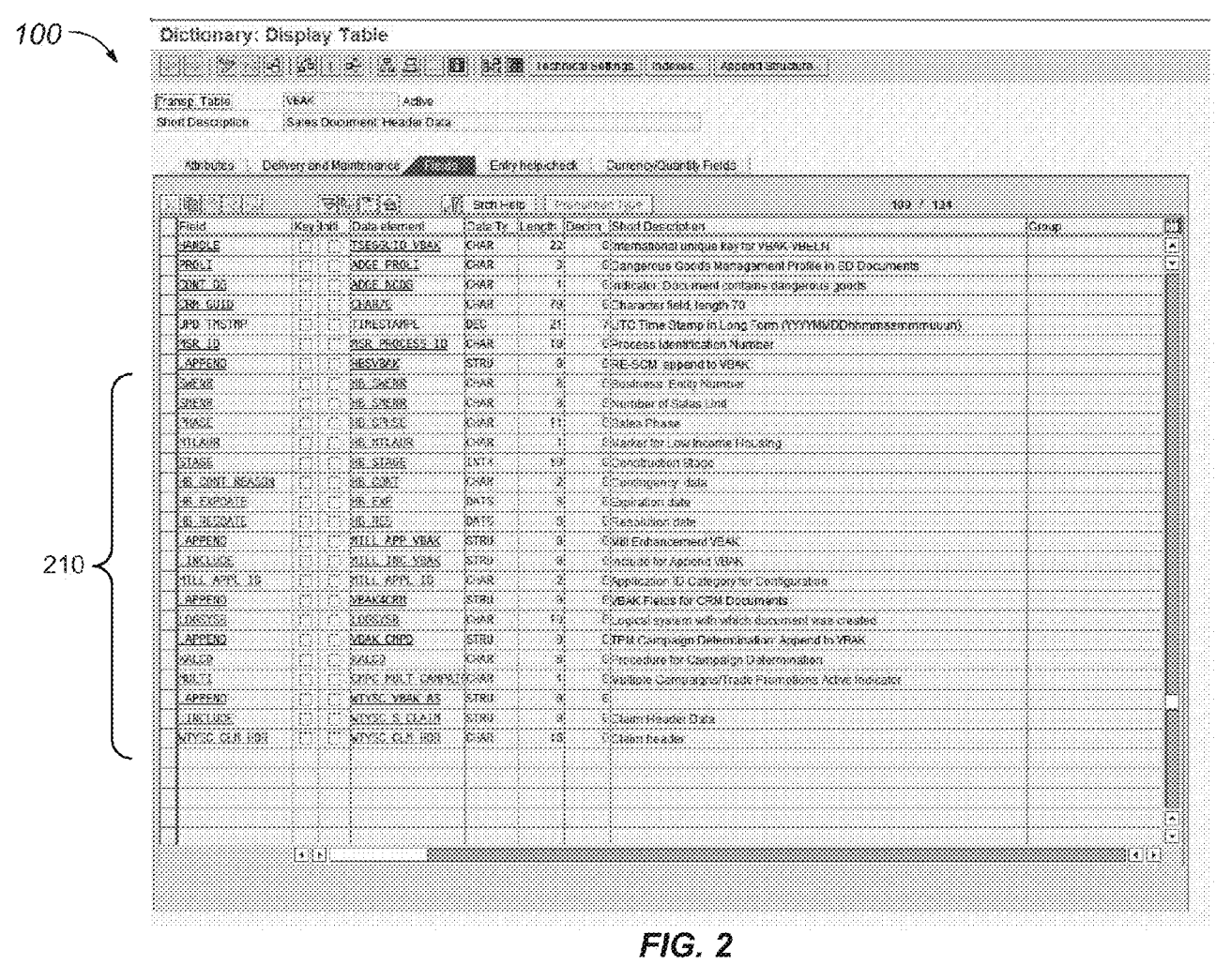

FIG. 2 illustrates another portion of the ABAP Dictionary 100 of FIG. 1, with APPEND structures 210 listed, according to various embodiments of the invention. Here the APPEND structures 210 that have been used to enhance the header table 110 are shown near the end of the dictionary 100. This view of the dictionary 100 reveals that the original fields and appended fields constitute a vast array of elements, many of which are not needed by common applications, and some of which are specific to customized revisions. Indeed, an even more complex situation may exist.

For example, FIG. 3 illustrates details for the Sales Document Type field 130 taken from the table of FIG. 1, according to various embodiments of the invention. Here it can be seen that a check table 310 describing the allowed values TVAK has been associated with the field 130.

FIG. 4 illustrates an example of the allowed Customer Name Space details 400 for the Sales Document Type field 130 taken from the table of FIG. 1, according to various embodiments of the invention. Included here are new entries in the customer name space starting with a "Z", such as ZTA for a customer-defined standard order 410. Such entries add even more complexity, comprising a portion of the customer-specific configuration and extension information maintained by the back end system. Additional examples of the complexity to be expected include changes in the status schema and the implications for allowed status changes or the impact on approval scenarios.

In a traditional implementation, an information technology (IT) expert would act to extract information manually from the back end system to adapt it to a specific project, such as the stationary web shop. However, via the available metadata, knowledge about customizing and extensibility, and other knowledge, useful information can be extracted automatically from the ABAP data dictionary into a derived model, which can be proposed to the web shop developer for use in a particular project. As discussed herein, this can be accomplished without extensively educating the developer as to all of the back end complexities. This is quite practical because, even without a perfect transformation of the original data model, substantially simpler consumption can usually be achieved via the principles illustrated herein.

Looking back at FIGS. 1-4, it can be seen that code lists and constraints can be adapted, as well as additional fields reflecting extensions in the back end. Mandatory fields can also be identified. Of course, after reading the information contained herein, and studying the figures, those of ordinary skill in the art will realize that these examples represent only a small portion of the elements that can be customized and configured. The organizational model can also be used to guide adaptation. In a very simple development case, there may be only one controlling area (e.g., store type=stationary, or country of operation=Germany), which greatly reduces the complexity of the interface. Company codes, cost center hierarchies, sales hierarchies, and management structures can be used in a similar fashion to automatically derive a simplified data model.

In some embodiments, there are different stages in the process. For example, the first stage might involve automatically deriving all usable information from the data dictionary and implementation guide (IMG) content based on metadata contained in these elements, and simple guided derivation logic. In the second stage, mapping rules can be used to take into account coded customizing specialties or application specialties which fall outside of the default data model categories. These rules can also describe dependencies in the data dictionary (e.g., between organization structure and master data).

Figure 5:
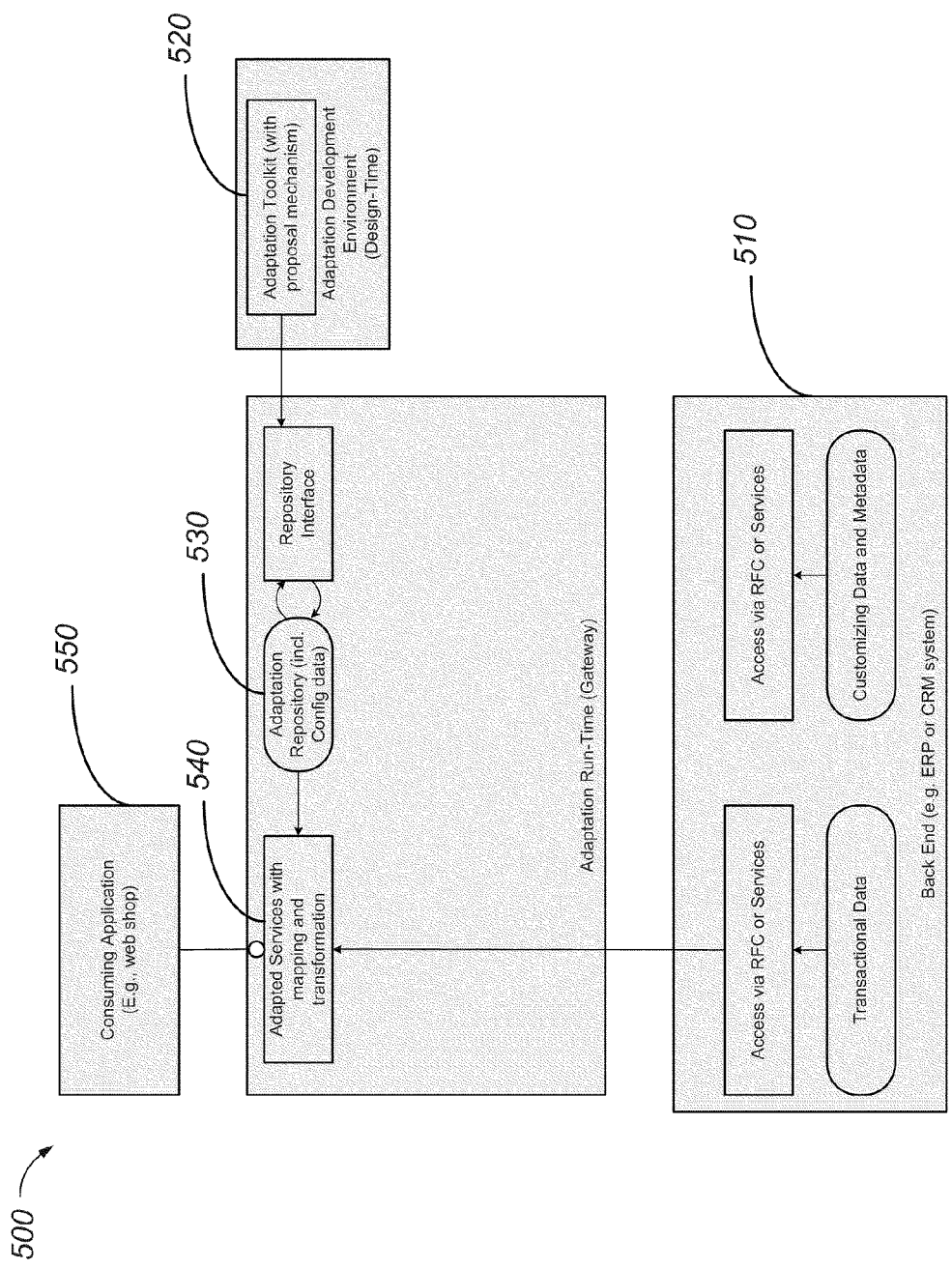
FIG. 5 illustrates a block diagram of the overall process, according to various embodiments of the invention.

FIG. 5 illustrates a block diagram of the overall process 500, according to various embodiments of the invention. Here the role-based lifecycle aspects of data model transformation are shown.

In this case, content delivered from the back end 510 can be used, via the adaptation toolkit 520, to create adapted content 530 which reflects customization of the underlying system. This might occur in the sense of the industry-specific templates described previously, for example. The web shop developer takes these models as an original data model and uses them, via various embodiments, to create a derived data model 540 which integrates the customization. The derived data model 540 may include the adapted services shown in the figure, and provide mapping and transformation to convert requests from the end-user (e.g., via the consuming application 550) to a format that is appropriate for interfacing with the transactional data, including customizing data and metadata of the back end 510.

If the back end 510 or the customization is modified, for example, due to business needs that dictate adding/removing customizing data (e.g. a new sales office is added), measures can be taken to consider the changes, and to notify mapping and/or transformation modules (engines). Changes to the back end 510 or the customization can thus be reflected back into the mapping and transformation functions. Potential conflicts between the derived data models 540 and requests can be identified proactively by the back end 510, or discovered via solicitation by the adaptation toolkit 520.

Figure 6:
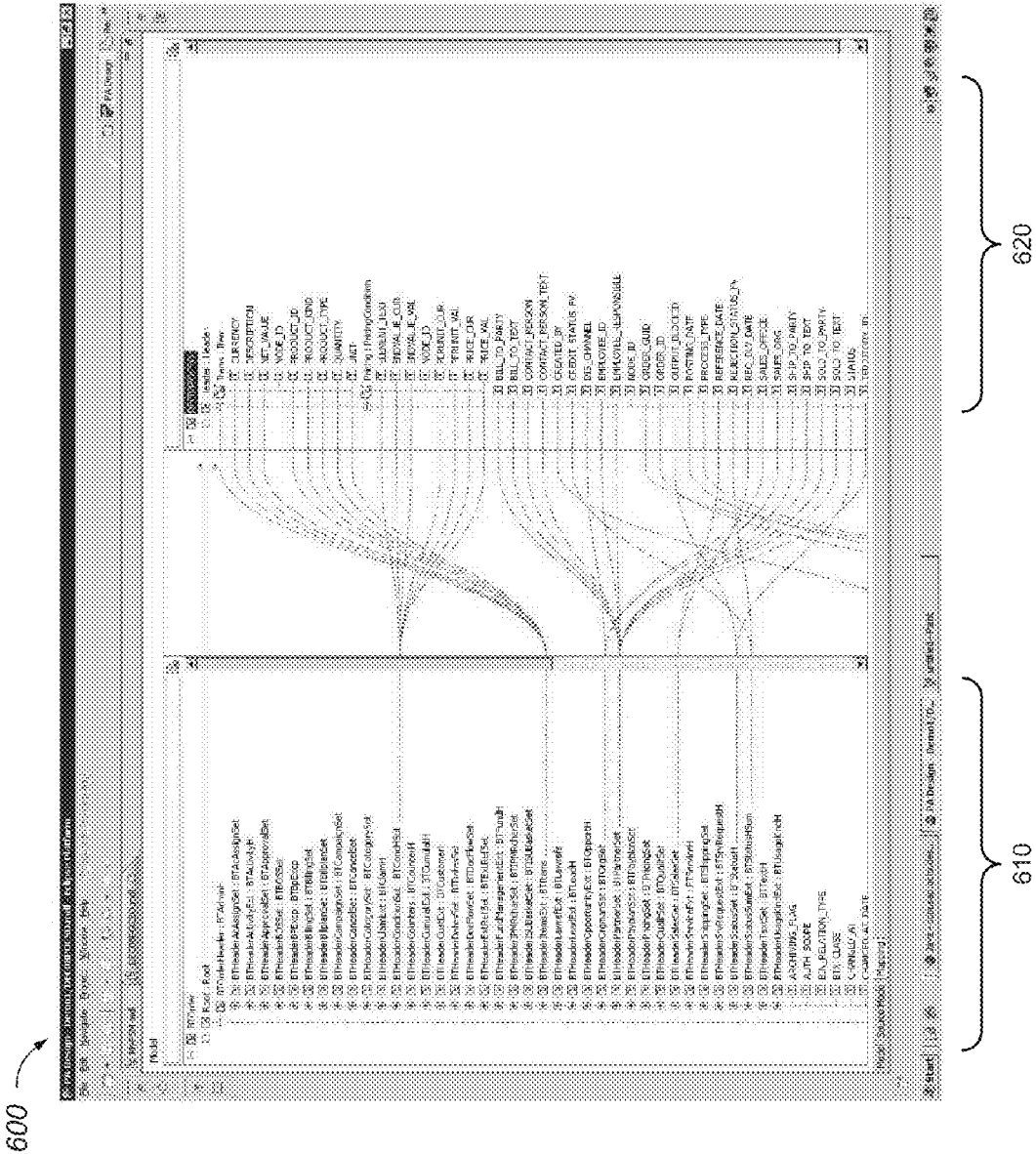
FIG. 6 illustrates a mapping tool interface that can be used as part of the data model adaptation process of FIG. 5, according to various embodiments of the invention.

FIG. 6 illustrates a mapping tool interface 600 that can be used as part of the data model adaptation process of FIG. 5, according to various embodiments of the invention. In this case, mapping relationships between the original data model elements 610 and corresponding query elements 620 that form part of the derived data model are shown. These relationships serve to provide the mapping services noted in the process of FIG. 5, and assist in the transformation of end-user queries (e.g., the stationary web shop sales order) into a format that is appropriate for reception by the original data model maintained by the back end. Thus, many embodiments may be realized.

Figure 7:
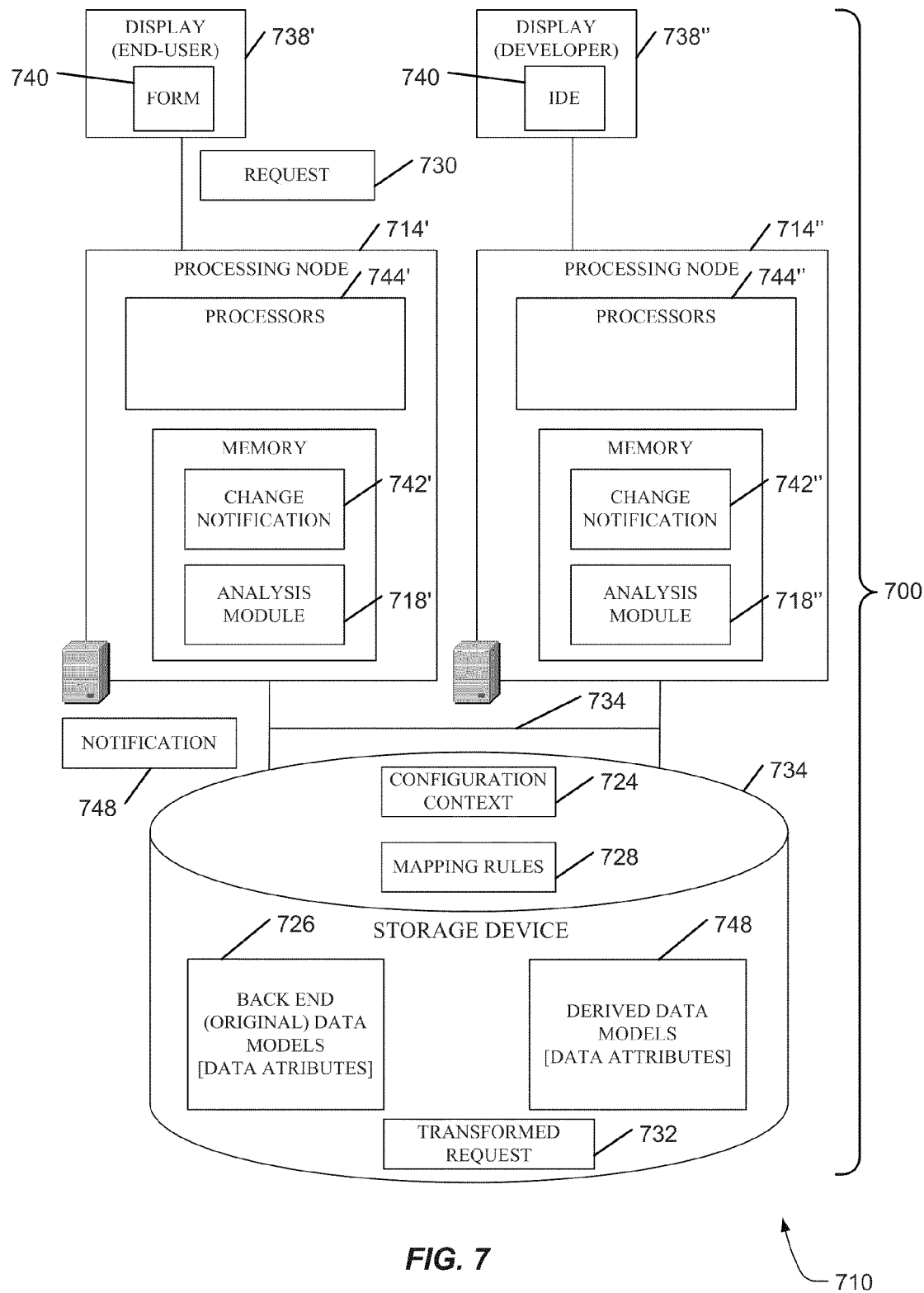
FIG. 7 is a block diagram of apparatus and systems, according to various embodiments of the invention.

For example, FIG. 7 is a block diagram of apparatus 700 and systems 710, according to various embodiments of the invention. Elements that may be similar or identical in this figure (depending on the particular implementation that is used) may be distinguished by prime and double-prime notation, as used for the processing nodes 714' and 714", the displays 738' and 738", and the processors 744' and 744", among others. Given the information discussed previously, it can be seen that in some embodiments, an apparatus 700 that operates to transform original data models 726 into derived data models 748 comprises one or more processing nodes 714 that include one or more processors 744 and analysis modules 718.

The back end data model 726 is an abstract model that is usually optimized for internal usage in a backend application. For example, the back end model 726 may be optimized in terms of archiving, consistency, or reuse capability. This is a relatively high level of abstraction, and not usually advantageous for consumption. In other words, an original purchase order data model might be applicable to any number of items, including computer systems, power plants, cars, etc. But this is potentially too complex for consumption by a specific consumer, such as a stationary store. Thus, the consumer expects a completely different (usually greatly simplified) model, such as the derived model 748. The gap between the two models 726, 748 is bridged by using the apparatus 700 and systems 710 described herein.

In some embodiments, the operations of the apparatus 700 and system 710 can be divided into design-time and run-time. Design-time refers to the time when the developer develops the application and defines all the data models and the transformation between them. When the application is finished, it is deployed to end-users for their productive use. Run-time refers to the time when the application is in use by the end-users. For example, at run-time, an end-user request from the web shop (returning to the example above) is transformed and the transformed request is used to call the back end. The response to the transformed request is then itself transformed into a representation that can be used by the front end (i.e., the web shop), and can be shown to the end-user.

During the design-time period, an integrated development environment (IDE), such as a development environment that includes a source code editor, compiler, interpreter, debugger etc. can be used by the developer to effect the data model transformations described. For example, a modified version of the Visual Studio® development system, or the Eclipse multi-language software development environment, can be used. An existing IDE and a plug-in system to extend it can also be used for this purpose. For example, the Eclipse development environment is written primarily in Java and can be used to develop applications in Java and, using various plug-ins, in C, C++, COBOL, Python, Perl, PHP, and others. Thus, one or more plug-ins to the Eclipse development environment can also be used to implement various embodiments.

In some instances, a much simpler solution can be used to implement various embodiments, such as a non-graphical, text-based interface. For example, an alternative to an IDE might be a simple web-based environment to publish the original backend models and configurations, and to permit maintaining the rules that apply the configurations to the models.

The original back end data model may comprise an application model or database model, among others. Derived model attributes can be generated automatically, or via manual changes made by a developer. This is useful because reduction/revision of the original model via context and business rules may not give the desired level of simplification, and the knowledge of the application developer may permit further simplification.

An apparatus 700 that implements the design-time aspect of some embodiments will now be described. The apparatus 700 may take the form of a server or client, or a group of nodes involving both. Thus, an apparatus 700 may comprise a processing node 714 coupled to one or more displays 738 to publish a plurality of stored back end data models 726 accessible to a user interface 740 and a development environment (e.g., IDE or text-based interface, among others).

The apparatus 700 may further include one or more analysis modules 718 to couple to the processing node 714, wherein the analysis module 718 is operative to receive a configuration context 724. The analysis module 718 can also operate to generate derived model attributes by filtering back end data attributes associated with the stored back end data models 726 according to the configuration context 724. In many embodiments, the analysis module 718 also operates to derive a set of mapping rules 728 based on the derived model attributes, the mapping rules 728 being used to transform an end-user request 730 into a transformed request 732 that communicates directly with one or more of the stored back end data models 726.

The apparatus may include a storage node 734 to store the mapping rules 728. Thus, in some embodiments, the apparatus 700 comprises a storage node 734 to store the set of mapping rules 728 to be used to direct run-time data request transformation activity. In some embodiments, the apparatus 700 comprises multiple processors 744, wherein the processing node comprises a first one of the multiple processors, and wherein the analysis module comprises a software module to be executed by a second one of the multiple processors. Other embodiments may be realized.

For example, an apparatus 700 that operates to implements the run-time aspect of various embodiments will now be described. In this case, the apparatus 700 may be formed as a server coupled to a storage device, among others. A user interface 740, perhaps comprising a graphical user interface (GUI), or some other user interface device, can provide a mechanism for the end-user to enter his request 730 in the language known to him. A variety of devices can thus be used as a user interface device, including a touch-screen display and speech-recognition software, for example.

Therefore, an apparatus 700 may comprise a storage node 734 to store a set of mapping rules 728 derived from a previously-selected configuration context 724, one of a plurality of stored back end data models 726, and derived model attributes (see derived data models 748) associated with the configuration context 724. The derived model attributes may be obtained by filtering back end data attributes associated with the one of the plurality of stored back end data models 726. Such filtering may occur by applying elements of the configuration context 724 (e.g., country of use, industry, etc.).

The apparatus 700 may also include a processing node 714 to receive an end-user request 730 from a user interface 740. The processing node can be used to transform the end-user request 730 into a transformed request 732 according to the set of mapping rules 728, and to transmit the transformed request 732 to one or more of the stored back end data models 726.

Changes to the original data models 726 may be actively solicited (e.g., via system interrogation messages), or received as notifications for further processing. Such processing may include adapting the set of mapping rules 728 to accommodate the changes. When existing back end systems are not able to proactively send out notifications, solicitation may be more appropriate.

Notifications 748 may occur as a result of a planned exchange of system messages, or as part of unplanned activity, such as when a system error occurs that results dues to the changes. In either case, the adaptation of the revised data models 748 can be handled automatically. In this way, changes to the back end data models 726 will be reflected in responses to end-user requests 730 that are made after the changes occur. Thus, in some embodiments, the apparatus 700 further comprises a change notification module 742 to receive or solicit notifications 748 of changes made to one or more of the stored back end data models 726. The processing node 714 can operate to modify the set of mapping rules 728 according to the changes.

The user interface 740 may take the form of a display 738 that is coupled directly to the processing node 714. Thus, in some embodiments, the user interface 740 comprises a display 738 coupled to the processing node 714. The display 738 can also be used to display the end-user request 730. Additional embodiments may be realized.

For example, a system 710 may comprise multiple processing nodes 714, including more than one of the apparatus 700, and perhaps multiple storage nodes 734. The various nodes may be coupled to each other over one or more networks 734. Still further embodiments may be realized.

Figure 8:
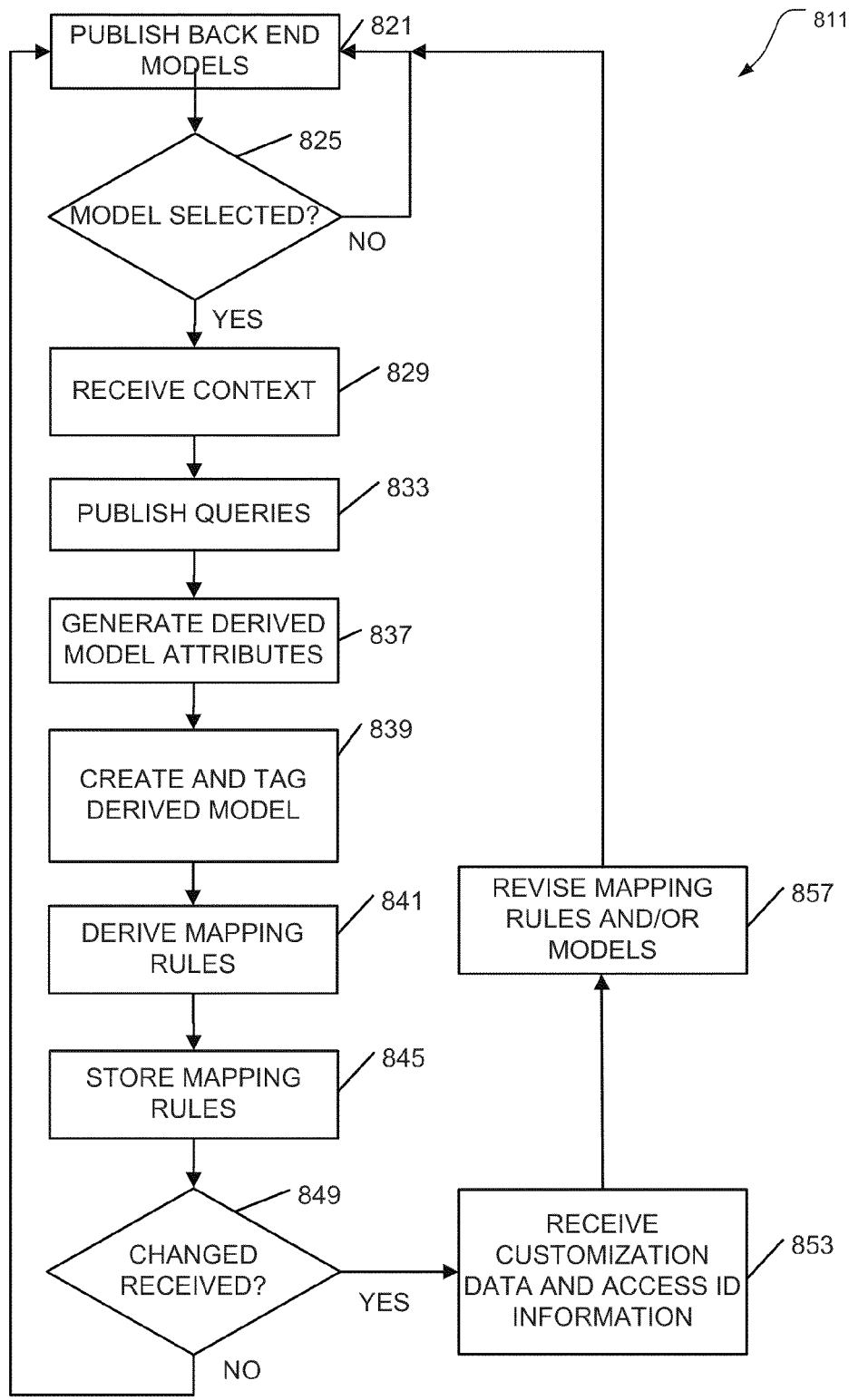
FIG. 8 is a flow diagram illustrating several computer-implemented methods according to various embodiments of the invention.

For example, FIG. 8 is a flow diagram illustrating several computer-implemented methods 811 according to various embodiments of the invention. The methods 811 are implemented in a tangible, machine-accessible and readable medium and are operational over processes within and among networks. The networks may be wired, wireless, or a combination of wired and wireless. The methods 811 may be implemented as instructions, which when accessed by a specific machine, perform the processing depicted in FIG. 8. Given this context, the transformation of data models will now be discussed with reference to FIG. 8.

In this case, the illustrated methods 811 emphasize the design-time aspect of various embodiments. Here, available database models are published/displayed for selection, a configuration context is received, derived model attributes are generated from the selected model by filtering attributes provided by the back end model, and mapping rules are derived for later use in transforming end-user requests (to interface with the back end).

The back end data models may comprise generic database models that are context-agnostic, such that an application (e.g., SAP Enterprise Resource Planning (ERP) software) interprets these models and the context at run-time. A derived model (e.g., a reduced model) is generated, as well as knowledge (mapping) of the relationship between the original model and the derived model, so that the connection to the original model can be stored for recall and use at a later time. Besides the derived model, services, events, and other interfaces used for consumption in different channels can be generated.

Thus, in various embodiments, a processor-implemented method 811 that can be use to transform back end data models may begin at block 821. The method 811 may be adapted to execute on one or more processors that perform the method, and the activity at block 821 may include publishing a plurality of stored back end data models accessible to a user interface and a development environment. Publication, here and elsewhere in this document, may include, for example, providing a human-readable display of selected information, printing the information in hardcopy form, expressing the information in audible format, or storing the information in a tangible memory, among others.

If a published model has not been selected, as determined at block 825, then the method 811 may return to block 821. If a model is selected, or no selection is needed (e.g., there is only one original model available), then the method 811 may proceed to block 829

The activity at block 829 may comprise receiving a configuration context. The configuration context can be received by a plug-in to the development environment, such as an IDE. Thus, in some embodiments, the development environment may comprise an IDE, and the activity at block 829 further comprises receiving the configuration context at a plug-in module to the IDE.

The size of the set of mapping rules that are eventually produced can be reduced by presenting context-specific queries to the developer. The responses to such queries can be received into the development environment as input, inside of which there may be a set of rules which takes this input for application to the data or the interface models. These models can then be revised according to the input. Thus, the method 811 may continue on to block 833 with publishing context-specific queries to obtain input to reduce a size of the set of mapping rules.

The method 811 may proceed to block 837 with generating derived model attributes by filtering, according to the configuration context, back end data attributes associated with one or more of the stored back end data models. The configuration context may be used against the back end data attributes that include appended table structures (e.g., APPEND structures in the ABAP Dictionary), extension points (e.g., Business Add Ins, or BADIs), and status schema. These are not exclusive in any sense, but constitute the more common sources of configured extensions to the back end data models. For example, the back end software is likely to grow over many releases as developers add specific extension points to certain parts of the application. Thus, the back end data attributes may comprise at least one of appended table structures, extension points, or status schema. The derived model attributes may be stored as part of a derived model at this point, if desired.

The method 811 may proceed on to block 839 with creating at least one derived model associated with the derived model attributes according to the configuration context. The derived models may be stored at this point, if desired.

The models created at design-time can be tagged with context information that can be leveraged at run-time. Tagging can be done manually by the developer using a development environment, or automatically derived, using configuration information associated with the back end. It is often desirable to derive as much context information as possible from the configuration information to automatically tag the resulting design-time models, which allows the developer to later add additional tags or rework the proposal that includes the derived data model. Thus, the activity at block 839 may include tagging the derived models with elements of the configuration context (e.g., perhaps comprising any one or more of a selected country, a selected organization type, a selected business process, a selected industry, or a selected management structure, among others).

In some cases, the derived model may exist only at run-time. For example, a derived model may operate to take into account run-time context information (e.g., the state of a sales order) and adapt the prior data model to produce a new derived model that can be used in main memory at run-time.

The method 811 may proceed to block 841 with deriving a set of mapping rules based on the derived model attributes. The mapping rules can be derived using data dictionary and implementation guide information associated with the selected original back end data model. The data dictionary describes metadata information (e.g., which fields are added or removed) while in the implementation guide describes the data itself (e.g., which code list should be used, what organizational structure is used, etc.). Thus, the activity at block 841 may comprise deriving the set of mapping rules according to at least one of a data dictionary and implementation guide information associated with the at least one of a plurality of stored back end data models.

The set of mapping rules can also be derived from user preferences and/or selectively-enabled/disabled functionality, perhaps provided according to the filter context or determined by the designer to be unnecessary. Thus, user preferences can also be used to select extensions (e.g., attributes and other features provided by enhancement packs) that influence the formation of the mapping rules. Therefore, the activity at block 841 may include deriving the set of mapping rules according to a user preference entry and/or functions enabled or disabled by the configuration context. The method 811 may proceed to block 845 with storing the set of mapping rules to be used to direct run-time data model request transformation activity.

The set of mapping rules can be updated based on new information entered into the back end data model. Notifications of change can be received as a result of solicitation, or received without solicitation. Thus, for example, an interrogation message/request may be sent to the back end to determine whether any changes have occurred, and the response can be received as a notification of the change. In other systems, the back end may operate proactively to send notifications of change on a periodic or even a real-time basis. Thus, in some embodiments, the method 811 comprises determining whether changes have been received at block 849. If so, the method 811 may include receiving notification of a change that has been made to one or more of the stored back end data models, and proceed on to block 853.

Figure 9:
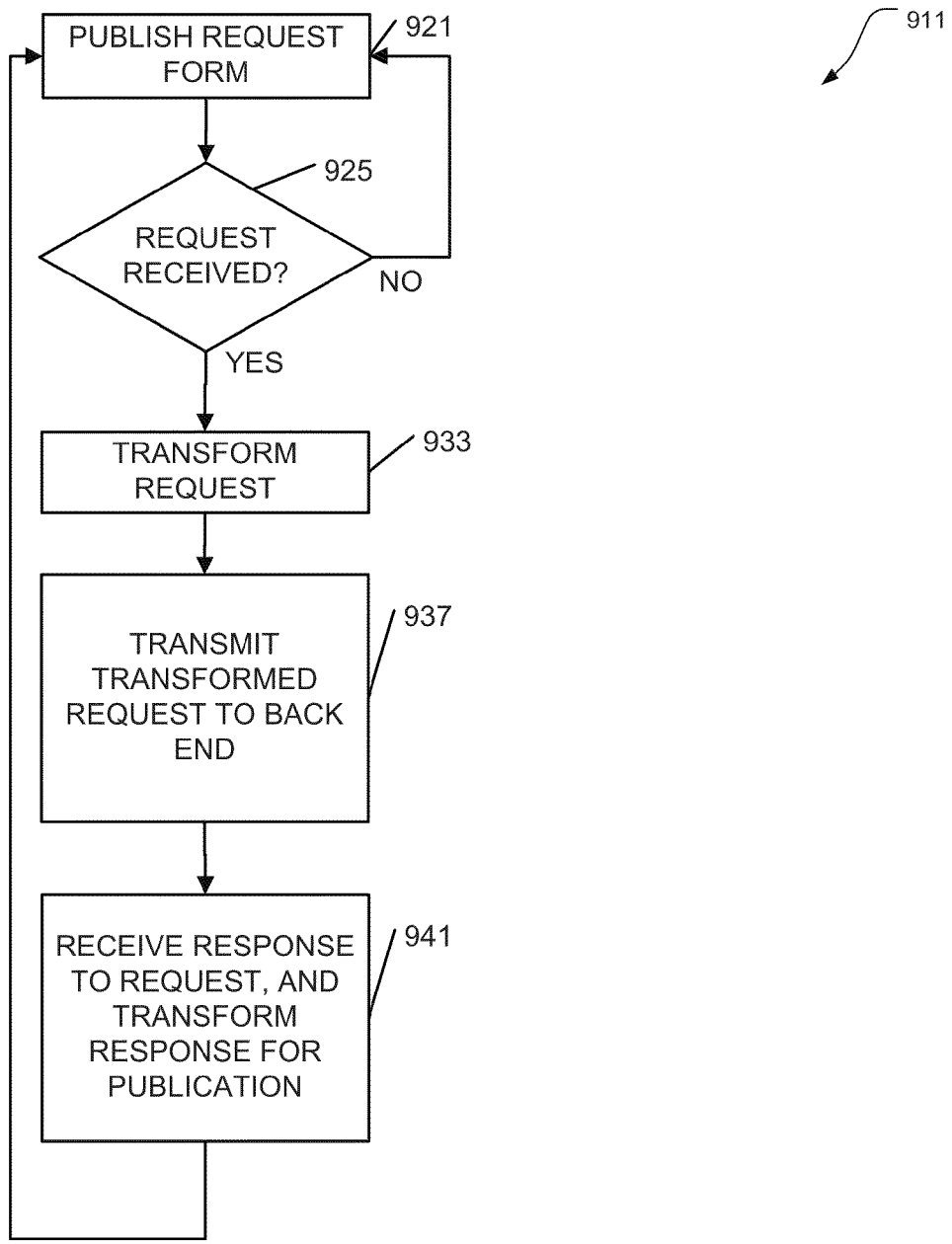
FIG. 9 is a flow diagram illustrating additional computer-implemented methods according to various embodiments of the invention.

In some cases, as noted previously, customization data that reflects changes to the original data model may be received from the back end at the development environment. Mapping rule sets can be associated with identification information to make the sets traceable, so that customization data can be used to modify the appropriate mapping rule sets. For example, if customization data is changed in the back end, the associated adaptation rules may be re-applied, which impacts the original model, which may in turn impact the derived model (e.g., an optional field was indicated in the back end data model, which has now changed to be mandatory, so it may no longer be left out of the derived model). Thus, the activity at block 853 may comprise receiving customization data associated with a change made to the at least one of a plurality of stored back end data models, and accessing identification information associated with the set of mapping rules to determine whether the customization data should be applied to the set mapping rules. The method 811 may proceed on to block 857 with revising the set of mapping rules and/or derived model according to the received changes. The method 811 may then proceed on to block 821. If no changes are received at block 849, the method 811 may return from block 849 to the activities of block 821. Still further embodiments may be realized. For example, FIG. 9 is a flow diagram illustrating additional computer-implemented methods 911 according to various embodiments of the invention. In this case, the methods 911 emphasize the run-time aspect of various embodiments. Here an end-user request is received and transformed according to a previously-derived set of mapping rules. The transformed request is then transmitted to the back end data model for consumption.

The methods 911 are implemented in a tangible, machine-accessible and readable medium and are operational over processes within and among networks. The networks may be wired, wireless, or a combination of wired and wireless. The methods 911 may be implemented as instructions, which when accessed by a specific machine, perform the processing depicted in FIG. 9. Given this context, the transformation of data models will now be discussed with reference to FIG. 9.

In some embodiments, the processor-implemented method 911 to execute on one or more processors that perform the method may begin by including the activity at block 921, and publishing a request form or providing some other suggestion to indicate that an end-user request is to be entered into the system.

The user interface that presents information prior to receiving the end-user request might operate to indicate mandatory fields. Thus, the activity at block 921 may include publishing a set of mandatory fields that form a portion of the end-user request via the user interface, perhaps deriving the mandatory fields from the set of mapping rules.

In some implementations, for example, the end-user request might originate from a modified catalog or sales order that has been simplified from the usual, more complex version, based on the set of mapping rules. Thus, the activity at block 921 might include publishing a modified catalog or a modified sales order (or both) via the user interface, the modified catalog and the modified sales order derived from an original catalog and an original sales order, respectively, and the set of mapping rules.

If no request is received at block 925, then the method 911 can return to block 921 to continue to solicit entry of the end-user request. The activity at block 925 may thus include receiving an end-user request from a displayed user interface, for example.

The end-user request can be received as part of a commercial business transaction. Thus, the activity at block 925 might include receiving the end-user request at a networked client machine, the end-user request forming a portion of a commercial business transaction.

Once the request has been received, the method 911 may proceed on to block 933 to include transforming the end-user request into a transformed request according to a stored set of mapping rules. The set of mapping rules may be derived from a previously-selected configuration context, one of a plurality of stored back end data models, and derived model attributes obtained by filtering back end data attributes associated with one or more back end data models. The previously-selected configuration context may comprise any number of elements, including a selected country, a selected organization type, a selected business process, a selected industry, a selected management structure, or a combination of these, among others.

The user interface that presents information prior to receiving the end-user request might operate to visually present fields that are mapped back to the original data model at run-time. Thus, the activity at block 933 may include mapping query fields published to an end-user via the user interface, operating as a graphical user interface, to fields in the one of the plurality of stored back end data models, the mapping being conducted according to the set of mapping rules.

In most embodiments, the method 911 proceeds to block 937 with transmitting the transformed request to one or more of the back end data models. The response to the transformed request can then, in turn, also be transformed for display to the end-user according to the mapping rules. Thus, in many cases, the method 911 continues on to block 941 with receiving a response to the transmission (of the transformed request), and transforming the response for publication to the end-user according to the set of mapping rules. This can occur, for example, when the request includes a database query, and the response comprises a reply to the query, which is then transformed so as to take a form that is expected as part of the end-user context, perhaps guided by the mapping rules.

The methods 811, 911 described herein do not have to be executed in the order described, or in any particular order. Moreover, various activities described with respect to the methods identified herein can be executed in repetitive, serial, or parallel fashion. The individual activities of the methods shown in FIGS. 8 and 9 can also be combined with each other and/or substituted, one for another, in various ways. Information, including parameters, commands, operands, and other data, can be sent and received in the form of one or more carrier waves. Thus, many other embodiments may be realized.

The various operations of example methods described herein may be performed, at least partially, by one or more processors that are temporarily configured (e.g., by software) or permanently configured (e.g., via hardware) to perform the relevant operations. Whether temporarily or permanently configured, such processors may constitute processor-implemented modules, logic, or managers that operate to perform one or more operations or functions. The modules, logic, and managers referred to herein may, in some example embodiments, comprise processor-implemented modules, logic, or managers.

Similarly, the methods described herein may be at least partially processor-implemented. For example, at least some of the operations of any one method may be performed by one or more processors or processor-implemented modules. The performance of certain operations may be distributed among the one or more processors, not only residing within a single machine, but deployed across a number of machines. In some embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)). Many embodiments may thus be realized.

Figure 10:
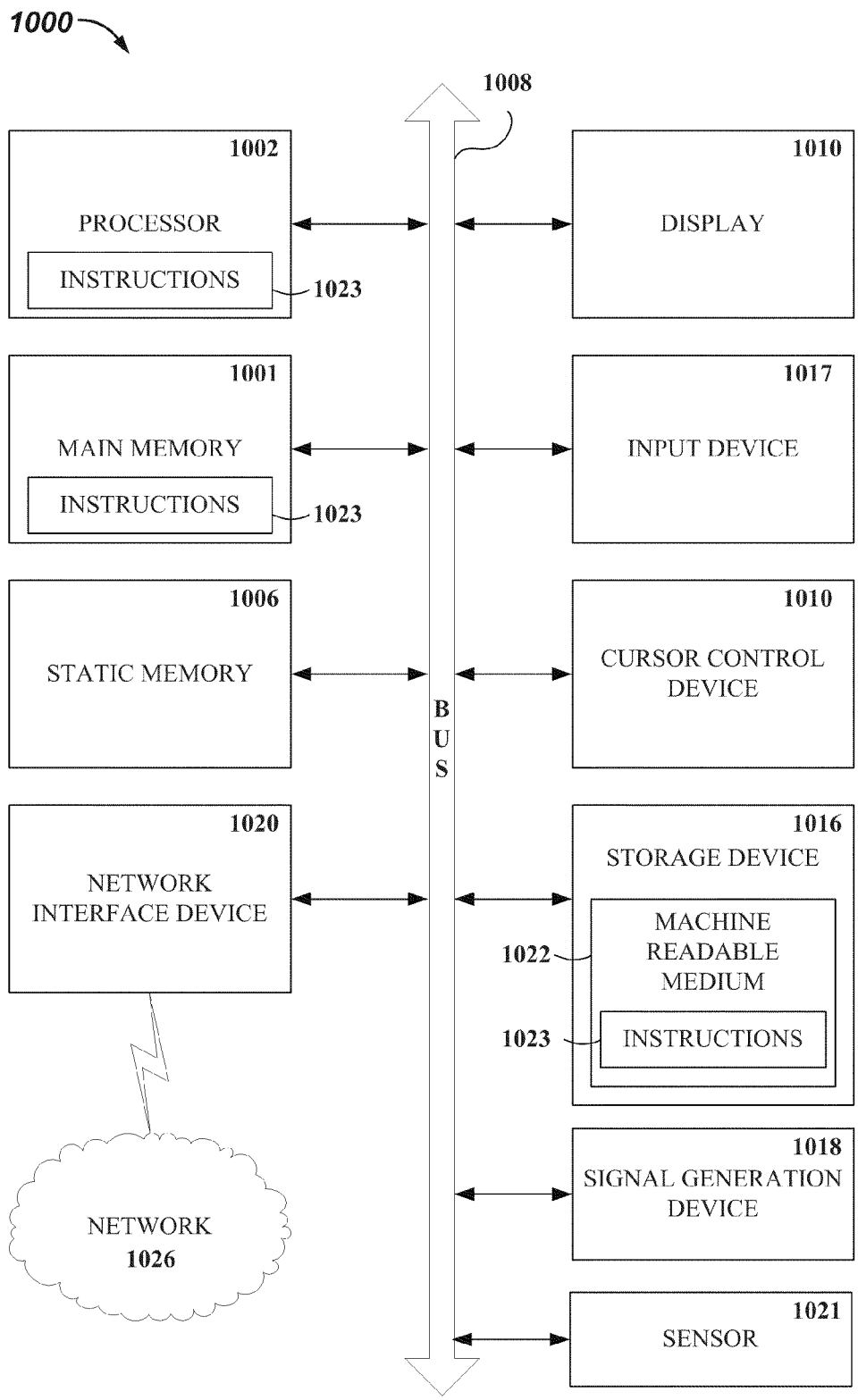
FIG. 10 is a block diagram of an article of manufacture, in the form of a specific machine, according to various embodiments of the invention.

For example, FIG. 10 is a block diagram of an article of manufacture, in the form of a specific machine, according to various embodiments of the invention. The specific machine may take the form of a computer system 1000.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand that various programming languages may be employed to create one or more software programs designed to implement and perform the methods and algorithms disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article of manufacture, such as a computer, a memory system, a magnetic or optical disk, some other storage device, and/or any type of electronic device or system may include one or more processors 1002 coupled to a machine-readable medium 1022 such as a memory (e.g., removable storage media, as well as any memory including an electrical, optical, or electromagnetic conductor) having instructions 1023 stored thereon (e.g., computer program instructions), which when executed by the one or more processors 1002 result in the machine performing any of the actions described with respect to the methods above. In some embodiments, the article of manufacture comprises a tangible medium 1022, such as a CD-ROM or other non-volatile memory, to store the instructions 1023.

In some embodiments, a computer system 1000 may operate as a specific machine that includes a processor 1002 (e.g., a central processing unit (CPU), a graphics processing unit (GPU) or both), a main memory 1001 and a static memory 1006, which communicate with each other via a bus 1008. The computer system 1000 may further include a display unit 1010, an alphanumeric input device 1017 (e.g., a keyboard), and a user interface (UI) navigation device 1011 (e.g., a mouse). In one embodiment, the display, input device and cursor control device form part of a user interface, such as a touch screen display. The computer system 1000 may additionally include a storage device 1016 (e.g., disk drive unit), a signal generation device 1018 (e.g., a speaker), a network interface device 1020, and one or more sensors 1021, such as a global positioning system sensor, compass, accelerometer, or other sensor.

The computer system 1000 may comprise a specific machine within which a set of instructions 1023, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In some embodiments, the machine comprises any one of a server, a personal computer (PC), a tablet PC, a set-top box (STB), a PDA, a mobile telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The system 1000 may be similar to or identical to the apparatus 700 or system 710 of FIG. 7.

Returning to FIG. 10, it can be seen that the storage device 1016 includes a machine-readable medium 1022 on which is stored one or more sets of instructions and data structures (e.g., instructions 1023) embodying or utilized by any one or more of the methodologies or functions described herein. The instructions 1023 may also reside, completely or at least partially, within the main memory 1001 and/or within the processor 1002 during execution thereof by the computer system 1000, the main memory 1001 and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 1023 may further be transmitted or received over a communications network 1026 using a transmission medium via the network interface device 1020 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

In conclusion, it can be seen that in many embodiments, interfaces provided to end-users as customers can be made more directly related to specific circumstances based on transformation of complex, original data models that comprise abstract definitions of service-oriented architecture (SOA) services that have been delivered to fit all possible configuration settings. In this way, customizing and extensions can be propagated into the consuming application to leverage dedicated implementation decisions made by the customer. Thus, implementing the apparatus, systems, and methods described herein may operate to improve the usability of interfaces that consume applications designed for specific customer situations. Further, the effort to develop consuming applications to re-implement customizing information on the consumer side may also be reduced. This may render the processing of large data files in a more efficient manner, providing higher performance and a simplified desktop experience. Improved allocation of processing resources, and increased user satisfaction, may also result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a processing node coupled to a display to publish at least one stored application-agnostic generic back end data model accessible to a user interface and a development environment; and
an analysis module to couple to the processing node, the analysis module configured to
receive an enterprise-specific configuration context,
filter generic back end data attributes associated with the at least one stored application-agnostic generic back end data model based on the enterprise-specific configuration context, to generate enterprise-specific derived model attributes associated with an enterprise-specific derived data model,
generate an enterprise-specific user interface based on the enterprise-specific derived model attributes, and
derive a set of mapping rules based on the enterprise-specific derived model attributes, the mapping rules to transform an end-user request received via the enterprise-specific user interface into a transformed request that communicates directly with the at least one stored application-agnostic generic back end data model,
wherein the processing node is further configured to publish one of a modified catalog or a modified sales order via the enterprise-specific user interface, the modified catalog and the modified sales order derived from an original catalog and an original sales order, respectively, and the set of mapping rules.

2. The apparatus of claim 1, further comprising:
a storage node to store the set of mapping rules to be used to direct run-time data request transformation activity.

3. The apparatus of claim 1, further comprising:
multiple processors, wherein the processing node comprises a first one of the multiple processors, and wherein the analysis module comprises a software module to be executed by a second one of the multiple processors.

4. An apparatus, comprising:
a storage node to store a set of mapping rules derived from a previously-selected enterprise-specific configuration context, an application-agnostic generic back end data model, and enterprise-specific derived model attributes associated with an enterprise-specific derived data model,
wherein generic back end data attributes associated with the application-agnostic generic back end data model are filtered based on the enterprise-specific configuration context, to generate the enterprise-specific derived model attributes associated with the enterprise-specific derived data model, and
wherein an enterprise-specific user interface is generated based on the enterprise-specific derived model attributes; and
a processing node to receive an end-user request from the enterprise-specific user interface, to transform the end-user request into a transformed request according to the set of mapping rules, and to transmit the transformed request to the application-agnostic generic back end data model,
wherein the processing node is further configured to publish one of a modified catalog or a modified sales order via the enterprise-specific user interface, the modified catalog and the modified sales order derived from an original catalog and an original sales order, respectively, and the set of mapping rules.

5. The apparatus of claim 4, further comprising:
a change notification module to receive or solicit notifications of changes made to the application-agnostic generic back end data model, the processing node to modify the set of mapping rules according to the changes.

6. The apparatus of claim 4, wherein the enterprise-specific user interface comprises:
a display coupled to the processing node, the display to display the end-user request.

7. A processor-implemented method to execute on one or more processors that perform the method, comprising:
publishing at least one stored application-agnostic generic back end data model accessible to a user interface and a development environment;
receiving an enterprise-specific configuration context;
filtering generic back end data attributes associated with the at least one stored application-agnostic generic back end data model based on the enterprise-specific configuration context, to generate enterprise-specific derived model attributes associated with an enterprise-specific derived data model;

generating an enterprise-specific user interface based on the enterprise-specific derived model attributes;

deriving a set of mapping rules based on the enterprise-specific derived model attributes, the mapping rules to transform an end-user request received via the enterprise-specific user interface into a transformed request that communicates directly with the at least one stored application-agnostic generic back end data model;

storing the set of mapping rules to be used to direct run-time data model request transformation activity based on the end-user request received via the enterprise-specific user interface; and publishing one of a modified catalog or a modified sales order via the enterprise-specific user interface, the modified catalog and the modified sales order derived from an original catalog and an original sales order, respectively, and the set of mapping rules.

8. The method of claim 7, wherein the development environment comprises an integrated development environment (IDE), and wherein the receiving further comprises:

receiving the enterprise-specific configuration context at a plug-in module to the IDE.

9. The method of claim 7, further comprising:

publishing context-specific queries to obtain input to reduce a size of the set of mapping rules.

10. The method of claim 7, further comprising:

receiving notification of a change to the at least one stored application-agnostic generic back end data model; and revising the set of mapping rules according to the change.

11. The method of claim 7, further comprising:

receiving customization data associated with a change made to the at least one stored application-agnostic generic back end data model; and accessing identification information associated with the set of mapping rules to determine whether the customization data should be applied to the set of mapping rules.

12. The method of claim 7, wherein the generic back end data attributes comprise at least one of appended table structures, extension points, or status schema.

13. The method of claim 7, wherein the deriving further comprises:

deriving the set of mapping rules according to at least one of a data dictionary and implementation guide information associated with the at least one stored generic back end data model.

14. The method of claim 7, wherein the deriving further comprises:

deriving the set of mapping rules according to at least one of a user preference entry and functions enabled or disabled by the enterprise-specific configuration context.

15. The method of claim 7, further comprising:

creating at least one enterprise-specific derived model associated with the enterprise-specific derived model attributes according to the enterprise-specific configuration context; and tagging the enterprise-specific derived model with elements of the enterprise-specific configuration context comprising at least one of a selected country, a selected organization type, a selected business process, a selected industry, or a selected management structure.

16. The method of claim 15, further comprising:

creating the enterprise-specific derived data model associated with the enterprise-specific derived model attributes according to the enterprise-specific configuration context, wherein the at least one enterprise-specific derived model is configured to take into account runtime context information to produce a new derived model.

17. The method of claim 7, wherein the enterprise-specific derived data model corresponds to a reduced version of the at least one stored application-agnostic generic back end data model, and wherein the at least one stored application-agnostic generic back end data model includes a plurality of data fields, and the enterprise-specific derived data model includes a first subset of the plurality of data fields and does not include a second subset of the plurality of data fields.

18. A processor-implemented method to execute on one or more processors that perform the method, comprising:

receiving an end-user request via an enterprise-specific user interface, the enterprise-specific user interface being generated based on enterprise-specific derived model attributes;

transforming the end-user request into a transformed request according to a stored set of mapping rules, the set of mapping rules derived from a previously-selected enterprise-specific configuration context, a stored application-agnostic generic back end data model, and the enterprise-specific derived model attributes, wherein generic back end data attributes associated with the stored application-agnostic generic back end data model are filtered based on the enterprise-specific configuration context, to generate the enterprise-specific derived model attributes associated with an enterprise-specific derived data model;

transmitting the transformed request to the stored application-agnostic generic back end data model; and publishing one of a modified catalog or a modified sales order via the enterprise-specific user interface, the modified catalog and the modified sales order derived from an original catalog and an original sales order, respectively, and the set of mapping rules.

19. The method of claim 18, wherein the enterprise-specific configuration context comprises at least one of a selected country, a selected organization type, a selected business process, a selected industry, or a selected management structure.

20. The method of claim 18, further comprising:

publishing a set of mandatory fields that form a portion of the end-user request via the user interface, the mandatory fields derived from the set of mapping rules.

21. The method of claim 18, further comprising:

mapping query fields published to an end-user via the enterprise-specific user interface, operating as a graphical user interface, to fields in the stored application-agnostic generic back end data model, the mapping according the set of mapping rules;

receiving a response to the transmitting; and transforming the response for publication to the end-user according to the set of mapping rules.

* * * * *